United States Patent [19]
Drexel

[11] Patent Number: 5,311,762
[45] Date of Patent: May 17, 1994

[54] FLOW SENSOR CALIBRATION

[75] Inventor: Charles F. Drexel, Rolling Hills, Calif.

[73] Assignee: DXL USA, Torrance, Calif.

[21] Appl. No.: 809,275

[22] Filed: Dec. 16, 1991

[51] Int. Cl.⁵ ............................................. G01F 25/00
[52] U.S. Cl. ............................................................. 73/3
[58] Field of Search .................... 73/3, 204.11, 204.23, 73/204.25

[56]       References Cited
U.S. PATENT DOCUMENTS

| | | | |
|---|---|---|---|
| 2,389,615 | 11/1945 | Eder | 73/3 |
| 3,938,384 | 2/1976 | Blair | 73/204.22 |
| 4,264,961 | 4/1981 | Nishimura et al. | 73/204.25 X |
| 4,320,650 | 3/1980 | Kita | 73/3 |
| 4,418,568 | 12/1983 | Surman | 73/204.21 X |
| 4,487,063 | 12/1984 | Hopper | 73/204.23 X |
| 4,524,616 | 6/1985 | Drexel et al. | 73/203 |
| 5,076,099 | 12/1991 | Hisanaga et al. | 73/3 X |
| 5,150,611 | 1/1992 | Kleinhans | 73/204.14 |

FOREIGN PATENT DOCUMENTS

| | | | |
|---|---|---|---|
| 250311 | 10/1987 | Japan | 73/204.11 |
| 53127 | 3/1991 | Japan | 73/204.11 |
| 53128 | 3/1991 | Japan | 73/204.11 |
| 1538130 | 1/1990 | U.S.S.R. | 73/3 |

OTHER PUBLICATIONS

"Two Point Calibration of the Lineariser for a Lot-Wire Anemometer", *J. Phys. E: Sci. Instrum.*, vol. 13, No. 12, pp. 1278-1279; Dec. 1980; F. Sakao.

Primary Examiner—Tom Noland
Attorney, Agent, or Firm—Spensley Horn Jubas & Lubitz

[57]       ABSTRACT

A method and apparatus for calibrating a flow sensor composed of two heat sensors each having an electrical impedance parameter which varies as a defined function of the temperature of the heat sensor and disposed in thermal communication with a fluid such that the relation between heat flow to or from one sensor and heat flow to or from the other sensor varies with the rate of fluid flow, a source supplying electric power at a selected level to the heat sensors, and an output device connected to produce an output signal representative of that heat flow relation, calibration being performed by: establishing a known flow rate for the fluid; electrically connecting one of the heat sensors to a circuit element which alters the magnitude of current flowing through the one heat sensor; and determining, in a first determining step, output signal value while the one heat sensor is electrically connected to the circuit element.

17 Claims, 1 Drawing Sheet

FLOW SENSOR CALIBRATION

BACKGROUND OF THE INVENTION

The present invention relates to the calibration of flow sensors, and in particular mass flow sensors of the type employed in flow meters and flow controllers.

In many industrial processes, a notable example of which is semiconductor fabrication procedures, there are many individual process steps which require, for their successful implementation, the supply of one or more gases each at an accurately controlled flow rate, or in an accurately controlled quantity.

When the quantity of a gas must be controlled, this can be done by properly selecting the flow duration of the gas if the flow rate is accurately known. For example, in connection with the manufacture of semiconductors, pyroforic or highly corrosive gases are commonly employed in chemical vapor deposition and etching processes.

In such gas flow systems conventional methods for checking the calibration of the output of a flow sensor are impractical, particularly those methods which involve a flow standard and a source of special gas for calibration.

Other known calibration methods are relatively time consuming and one currently employed alternative to calibration is simply the replacement of one flow meter by another flow meter which has been recently calibrated. This solution has the disadvantage that it requires purging of the gas flow path before replacement of the flow sensor.

SUMMARY OF THE INVENTION

It is an object of the present invention to permit the calibration of such a flow sensor to be tested, in a manner to allow any necessary recalibration to be performed, in a relatively short period of time and without requiring removal of the sensor from the gas flow path.

Another object of the invention is to check sensor calibration in a manner which facilitates automated calibration adjustment.

The above and other objects are achieved, according to the present invention, in connection with a flow sensor composed of two heat sensors each having an electrical impedance parameter which varies as a defined function of the temperature of the heat sensor, means for supplying electric power at a selected level to the heat sensors, means for causing a fluid to flow in thermal communication with the heat sensors such that the relation between heat flow to or from one sensor and heat flow to or from the other sensor varies with the rate of fluid flow, and output means connected to produce an output signal representative of that heat flow relation, by a calibration method comprising: establishing a known flow rate for the fluid; electrically connecting one of the heat sensors to a circuit element which alters the magnitude of current flowing through the one heat sensor; and determining, in a first determining step, the output signal value while the one heat sensor is electrically connected to the circuit element.

The objects according to the invention are further achieved by apparatus for calibrating a flow sensor composed of two heat sensors each having an electrical impedance parameter which varies as a defined function of the temperature of the heat sensor, means supplying electric power at a selected level to the heat sensors, means for causing a fluid to flow in thermal communication with the heat sensors such that the relation between heat flow to or from one sensor and heat flow to or from the other sensor varies with the rate of fluid flow, and output means connected to produce an output signal representative of that heat flow relation, which apparatus includes: at least one circuit element capable of altering the magnitude of current flowing through a heat sensor; means for electrically connecting one of the heat sensors to the circuit element; and means for determining the output signal value while the one heat sensor is electrically connected to the circuit element and the fluid has a known flow rate.

The fundamental principle underlying the invention is that, with a given flow rate, the apparent temperature being detected by at least one of the heat sensors is altered by electrical circuit means in a known, reproducible manner and the resulting reading is compared with a reading produced under similar conditions at a previous time when the sensor was known to be calibrated. The result of the comparison will produce an indication of calibration drift, which can be employed to directly control the output signal from the sensor so as to recalibrate the unit.

Representative flow meters to which the invention may be applied include: those described in U.S. Pat. Nos. 3,938,384 and 4,524,616, which patents are herein incorporated by reference; flow meters marketed by the Tylan General Company under model designations such as FC-260; and flow meters marketed by the Lintec Company under model designations such as MC-100 and MC-200.

DESCRIPTION OF THE PREFERRED EMBODIMENTS

The control of a gas flow is based on an output signal produced by a flow sensor. This output signal can be delivered to some type of indicator, in the case of a flow meter, or to a flow rate controlling element, in the case of a flow controller.

Most high accuracy devices, such as mass flow controllers operating at gas flows below 200 liters per minute, utilize the thermal by-pass principle. According to this principle, a sensitive mass flow sensor composed of a small diameter flow tube in thermal communication with resistance thermometers is connected in parallel with a fixed restriction which is designed to divide a gas flow, according to a constant ratio, so that a very small, but accurately determined, percentage of the total flow passes through the small diameter tube.

Figure 1:
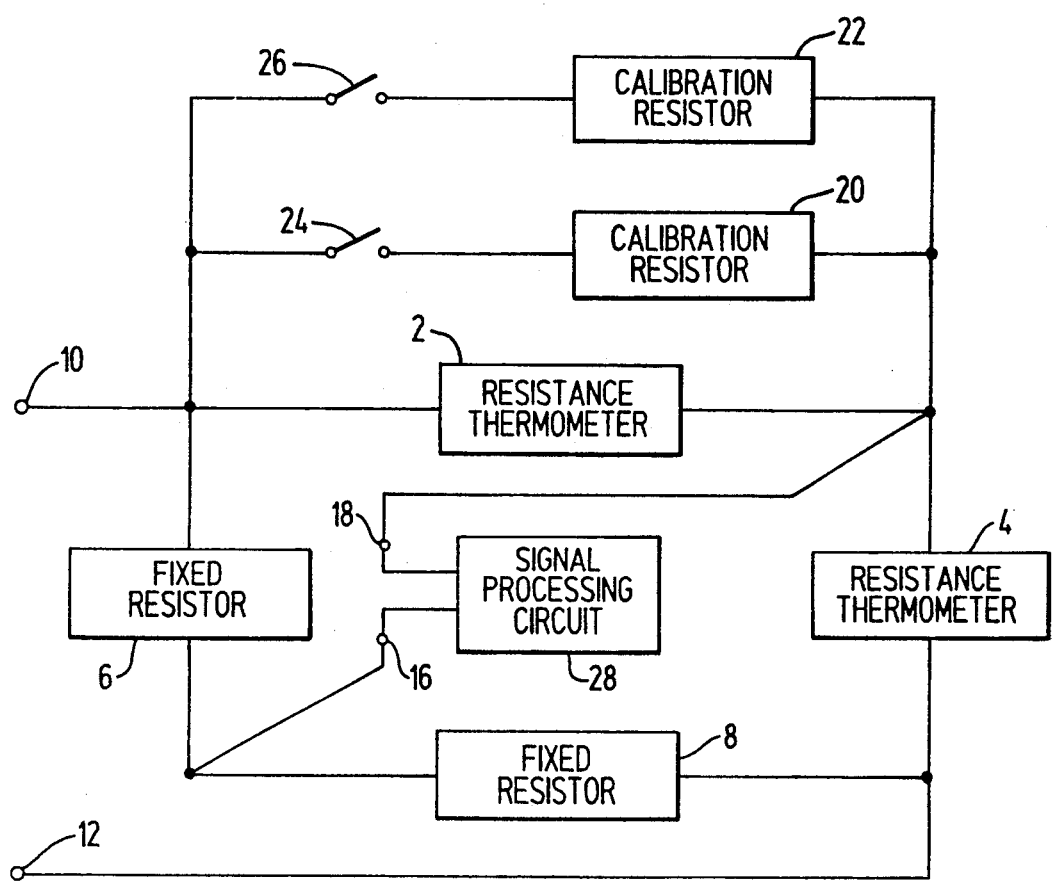
FIGS. 1 and 2 are circuit diagrams illustrating two embodiments of the invention in a flow sensor which operates according to the thermal by-pass principle.
Figure 2:
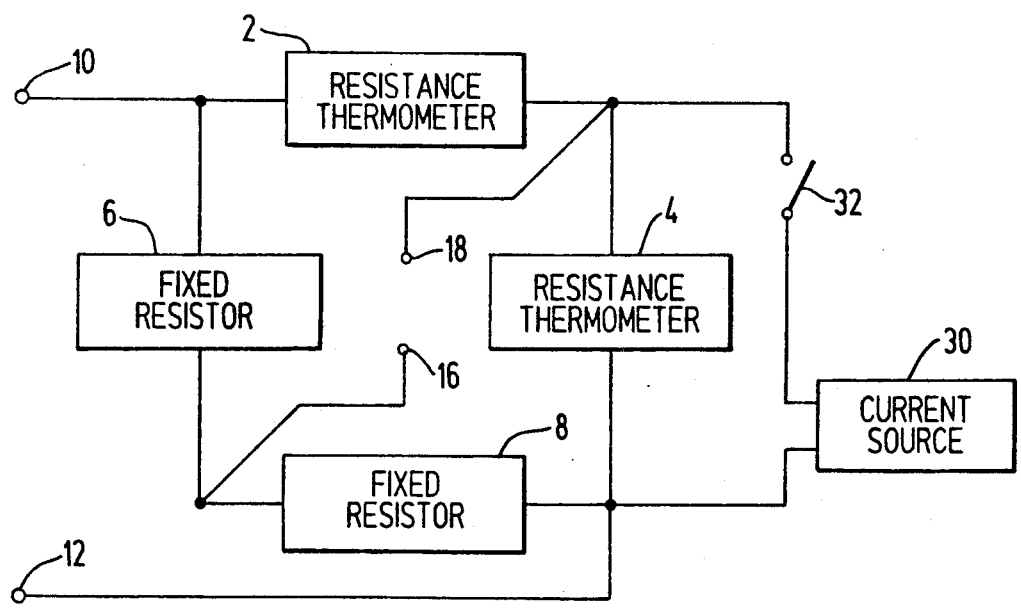

Referring to FIGS. 1 and 2 of the drawing, such devices include two resistance thermometers 2 and 4 thermally coupled to a capillary tube which constitutes the above-mentioned small diameter pipe (not shown). Resistance thermometers 2 and 4 are spaced from one another along the length of the capillary tube.

If resistance thermometers 2 and 4 are being heated, by electrical current flowing between connections 10 and 12, and a gas which is at a lower temperature than at least the upstream resistance thermometer 2 is caused to flow through the capillary tube, heat will be transferred from resistance thermometer 2 to the gas, raising the temperature of the gas. As a result, the net heat transfer from resistance thermometer 4 to the gas will be lower than that occurring from resistance thermometer 2. A lower net heat transfer can include a smaller heat transfer from resistance thermometer 4 to the gas or a net heat transfer from the gas to resistance thermometer 4. In either event, a gas flow will produce a difference between resistance thermometers 2 and 4 with respect to net heat flow therefrom, and that difference, depending on the manner in which the delivery of electrical energy to the resistance thermometers is controlled, produces a differential in the temperatures of the two resistance thermometers or a differential in the rate of delivery of energy to the two resistance thermometers.

In the embodiments illustrated in FIGS. 1 and 2, resistance thermometers 2 and 4 are connected in two legs of a resistance bridge whose other two legs contain fixed resistors 6 and 8. One opposed pair of bridge terminals is connected to the outputs of an excitation source via input terminals 10 and 12. The excitation source, which is not shown in the drawing, may be one which produces a substantially constant power, voltage, or current output. The other pair of opposed bridge terminals is connected via sensor output signal terminals 16 and 18, to a signal processing circuit 28 which may be any type commonly employed in flow meters or controllers.

When processing circuit 28 is properly calibrated, it will provide an accurate indication or control of the rate of fluid flow through the capillary tube and hence through the flow meter or controller.

If the gas in the capillary tube is not flowing, the flow rate is equal to zero, and both resistance thermometers 2 and 4 receive the same heating current, they will experience the same net heat flow and if the bridge resistances have their intended values, the processing circuit 28 will have a predetermined response, usually zero. Typically, processing circuit 28 will be connected to an indicator or a flow controlling element and includes an amplifying circuit which can experience drift in one or more of its characteristics, resulting in an erroneous indication or control setting.

There are sources of calibration drift which may or may not be observable in the response of circuit 28 when the gas flow rate is equal to zero. For example, in many existing devices, it can easily occur that at zero flow rate, the voltage between bridge terminals 16 and 18 will be zero and that any drift experienced by processing circuit 28 or by changes in the stress electrical resistance or heat transfer of resistance thermometers 2 and 4, will not affect its response to a zero input voltage. However, it is desirable to be able to obtain calibration measurements at a flow rate of zero because this is a flow rate which can be determined to exist in a highly reliable manner simply by fully closing a valve in the gas flow line.

Calibration is achieved by first calibrating the response of the flow sensor and signal conditioning circuit to known gas flowrates, and then, with the gas flow at zero, electrically altering the current flow through one heat sensor in a reproducable manner and observing the output of the signal conditioner. At a future date, to check calibration with the gas flow at zero, the electrical current flow is again altered through the same heat sensor and the output of the signal conditioner compared to the previous reading. Any deviation is caused by drift of the flow sensor or calibration circuit. The magnitude of the deviation is related to the magnitude of the drift.

In the embodiment shown in FIG. 1, the controlled difference is produced by one or more calibration resistors 20, 22, each connected in series with a respective switch 24, 26. Each series arrangement of a calibration resistor and a switch is connected in parallel with resistance thermometer 2. When one or both of switches 24 and 26 is closed, the current through heating thermometer 2 will be reduced, resulting in a corresponding reduction in the heating of that thermometer and thus its resistance. At the same time, since the resistance in the branch containing thermometer 2 is reduced, the currents through the other legs of the bridge will be altered, and, in particular, the current through thermometer 4 will increase, at least to a small degree. In other words, one or both of circuit elements, or calibration resistors, 20, 22 will act to alter the magnitude of the current flowing through heat sensor, or thermometer, 2 in one sense and alter the magnitude of the current flowing through the other heat sensor, or thermometer, 4 in the opposite sense. In any event, the net result is a difference between the temperatures of thermometers 2 and 4, while resistors 6 and 8 maintain their original resistances, resulting in a change in the output voltage between terminals 16 and 18, and thus at the output terminals of electronic components connected to terminals 16 and 18.

When, as described above, all conditions are identical to those existing at a time when the sensor was calibrated, any difference between the output from the electronic components connected to terminals 16 and 18 and the value of that output at the time the sensor was known to be calibrated will be representative of a calibration drift which can be corrected by a compensating adjustment of those electronics.

According to a similar principle, in the embodiment shown in FIG. 2, a current source 30 is connected, via a switch 32, across resistance thermometer 4. When switch 32 is closed, an additional current component will flow through both resistors 2 and 4. However, if the current from current source 30 has the appropriate polarity, the result can be a net reduction in the current flowing through thermometer 2 and a net increase in the current flowing through thermometer 4, producing, between thermometers 2 and 4, a temperature difference, and thus a corresponding resistance difference, comparable to that described above. Here again, if the current supplied by current source 30 has an accurately reproducible value, it can produce output conditions which may be compared with those obtained at a time when the sensor was known to be calibrated in order to provide an indication of calibration drift.

By closing one or more of the switches 24, 26, in the embodiment of FIG. 1, or varying the current produced by source 30, in the embodiment of FIG. 2, there can be produced a series of calibration outputs, each corresponding to an apparent mass flow.

The readings produced by signal processing unit 28 for each set of closing states of switches 24 and 26, or for each current level from source 30, when the sensor is known to be calibrated, may be stored in a digital memory. Then, at a later time, under control of a central processing unit, calibration can be checked by reestablishing the flow rate that existed when the initial calibration values were stored, this preferably being a zero flow rate, establishing one or more switching states for switches 24, 26 or current flow level from source 30, observing the resulting output signal or signals from processing circuit 28, comparing those signals with the previously stored signals, and using the comparison result to effect a calibration adjustment. Such a calibration adjustment can be performed, in an analog circuit, by simply varying the circuit gain. In a digital circuit, recalibration can be achieved by varying a multiplication constant, or other suitable equation parameter, until the output from processing circuit 20 corresponds to that which existed at the time of initial calibration.

In practice, the zero setting of a controller would be adjusted before performing the calibration operation described above so that any error observed during calibration would indicate a change in the gain of processing circuit 28 which can be corrected by varying that gain.

The embodiments illustrated in the accompanying drawing are capable of giving the current through a selected resistance thermometer two or more predetermined calibration values. This can be done in the embodiment of FIG. 1 by closing different ones or different combinations of the switches and in the embodiment of FIG. 2 by varying the current output from the source.

Provision of two or more calibration values permits the derivation of an equal number of calibration points that can serve as reference points for a calibration curve. The curve derived in this manner can be compared, in a suitable data processor, to provide an indication of any error in the gain and any zero offset in the flow sensing and signal processing system. Such errors can thus be automatically corrected by appropriate adjustment of the gain and zero flow output level of the processing circuit.

The invention could also be applied to flow controllers which differ from those illustrated in FIGS. 1 and 2 in the following respects: instead of conducting a heating current through thermometers 2 and 4, a separate heating coil is provided and is disposed symmetrically with respect to thermometers 2 and 4 in order to heat those thermometers equally in the absence of any fluid flow. The current conducted through the resistance thermometers is very small and does not itself cause any significant heating. In such devices, one or the other of the thermometers could be connected in the manner shown in FIGS. 1 and 2 to permit calibration to be effected in precisely the manner described above.

The invention could also be applied to mass flow sensors which employ thermistors in places of resistance thermometers. Thermistors differ from resistance thermometers in that they have a negative temperature coefficient of resistance. However, the principle described above is equally applicable to temperature sensors in the form of thermistors, as well as any other type of temperature sensor which has an electrical parameter which varies as a defined function of its temperature.

However, in the case of temperature sensors having a negative temperature coefficient of resistance, it would be preferable to place the calibration resistors 20, 22 and their associated switches 24 and 26 in parallel with the downstream sensor, or current source 30 and its associated switch 32 across the upstream sensor.

The embodiments described above have been particularly selected for use with mass flow sensors which have a limited ability to respond to and indicate negative outputs. However, if processing circuit 28 were capable of producing substantial negative output, then it would be possible to connect the circuit elements 20-26 across thermometer 4 in FIG. 1, or to connect source 30 and switch 32 across thermometer 2 in FIG. 2, in place of the illustrated connections.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A method of calibrating a flow sensor composed of two heat sensors each having an electrical impedance parameter which varies as a defined function of the temperature of the heat sensor, means for supplying electric power at a selected level to the heat sensors, means for causing a fluid to flow in thermal communication with the heat sensors such that the relation between heat flow to or from one sensor and heat flow to or from the other sensor varies with the rate of fluid flow, and output means connected to produce an output signal representative of that heat flow relation, said method comprising:
    establishing a known flow rate for the fluid;
    electrically connecting one of the heat sensors to a circuit element which alters the magnitude of current flowing through the one heat sensor; and
    determining, in a first determining step, the output signal value while the one heat sensor is electrically connected to the circuit element, wherein the circuit element is a resistor and said step of electrically connecting connects the resistor in parallel with the one of the heat sensors.

2. A method as defined in claim 1 comprising determining, in a preliminary determining step, the output signal value while the one heat sensor is electrically connected to the circuit element at a time when the fluid has a known flow rate and the flow sensor is known to be calibrated.

3. A method as defined in claim 2 further comprising comparing the output signal values determined in said two determining steps.

4. A method as defined in claim 3 further comprising adjusting the output means in response to the result of said comparing step.

5. A method as defined in claim 2 wherein the flow rate at the time of said preliminary determining step has the same value as the flow rate at the time of said first determining step.

6. A method as defined in claim 5 wherein the flow rate at the times of both determining steps is zero.

7. A method as defined in claim 1 wherein the step of determining is performed while the circuit element is being operated to alter the magnitude of the current flow through the one heat sensor.

8. A method as defined in claim 1 wherein the circuit element alters the magnitude of the current flowing through the one heat sensor in one sense and alters the magnitude of the current flowing through the other heat sensor in a sense opposite to the one sense.

9. A method of calibrating a flow sensor composed of two heat sensors each having an electrical impedance parameter which varies as a defined function of the temperature of the heat sensor, means for supplying electric power at a selected level to the heat sensors, means for causing a fluid to flow in thermal communication with the heat sensors such that the relation between heat flow to or from one sensor and heat flow to or from the other sensor varies with the rate of fluid flow, and output means connected to produce an output signal representative of that heat flow relation, said method comprising:

establishing a known flow rate for the fluid;

electrically connecting one of the heat sensors to a circuit element which alters the magnitude of current flowing through the one heat sensor; and determining, in a first determining step, the output signal value while the one heat sensor is electrically connected to the circuit element, wherein the circuit element is a current source and said step of electrically connecting connects the current source across the one of the sensors.

10. A method as defined in claim 9 comprising determining, in a preliminary determining step, the output signal value while the one heat sensor is electrically connected to the circuit element at a time when the fluid has a known flow rate and the flow sensor is known to be calibrated.

11. A method as defined in claim 10 further comprising comparing the output signal values determined in said two determining steps.

12. A method as defined in claim 11 further comprising adjusting the output means in response to the result of said comparing step.

13. A method as defined in claim 10 wherein the flow rate at the time of said preliminary determining step has the same value as the flow rate at the time of said first determining step.

14. A method as defined in claim 13 wherein the flow rate at the times of both determining steps is zero.

15. A method as defined in claim 9 wherein said step of determining is performed while the circuit element is being operated to alter the magnitude of the current flow through the one heat sensor.

16. A method as defined in claim 9 wherein the circuit element alters the magnitude of the current flowing through the one heat sensor in one sense and alters the magnitude of the current flowing through the other heat sensor in a sense opposite to the one sense.

17. In apparatus for calibrating a flow sensor composed of two heat sensors each having an electrical impedance parameter which varies as a defined function of the temperature of the heat sensor, means for supplying electric power at a selected level to the heat sensors, means for causing a fluid to flow in thermal communication with the heat sensors such that the relation between heat flow to or from one sensor and heat flow to or from the other sensor varies with the rate of fluid flow, and output means connected to produce an output signal representative of that heat flow relation, the improvement comprising:

at least one circuit element capable of altering the magnitude of current flowing through a heat sensor;

means for electrically connecting one of said heat sensors to said circuit element; and means for determining the output signal value while said one heat sensor is electrically connected to said circuit element and the fluid has a known flow rate, wherein said at least one circuit element includes two resistors and said means for electrically connecting comprise two switches each connected in series with a respective resistor.

* * * * *